United States Patent [19]
Kazami

[11] Patent Number: 5,412,444
[45] Date of Patent: * May 2, 1995

[54] INFORMATION RECORDING CONTROL APPARATUS IN A CAMERA

[75] Inventor: Kazuyuki Kazami, Tokyo, Japan

[73] Assignee: Nikon Corporation, Tokyo, Japan

[*] Notice: The portion of the term of this patent subsequent to Apr. 12, 2011 has been disclaimed.

[21] Appl. No.: 209,623

[22] Filed: Mar. 14, 1994

Related U.S. Application Data

[63] Continuation of Ser. No. 91,750, Jul. 15, 1993, Pat. No. 5,302,986, which is a continuation of Ser. No. 921,044, Jul. 28, 1992, abandoned, which is a continuation-in-part of Ser. No. 745,287, Aug. 14, 1991, abandoned.

[30] Foreign Application Priority Data

Aug. 17, 1990 [JP] Japan ................................ 2-217544
Aug. 16, 1991 [JP] Japan ................................ 3-229615

[51] Int. Cl.⁶ ............................................ G03B 17/24
[52] U.S. Cl. ............................................... 354/106
[58] Field of Search .................... 354/24, 105, 106; 352/92

[56] References Cited

U.S. PATENT DOCUMENTS 4,864,332 9/1989 Harvey ................................. 354/21
5,302,986 4/1994 Kazami ............................... 354/106

*Primary Examiner*—David M. Gray
*Attorney, Agent, or Firm*—Shapiro and Shapiro

[57] ABSTRACT

An information recording control apparatus in a camera is provided with reproducing means for reproducing information pre-recorded on film, recording means for recording information on the film, evaluation means for evaluating a state in which a signal is recorded on the film on the basis of the output state of the reproduction signal by the reproducing means, and control means for setting the recording condition of the recording means in conformity with the result of the evaluation by the evaluation means. The evaluation means evaluates the reproduction signal when the reproducing means reproduces the information pre-recorded on the film, and the control means sets the recording condition of the recording means in conformity with the result of the evaluation.

2 Claims, 8 Drawing Sheets

INFORMATION RECORDING CONTROL APPARATUS IN A CAMERA

This is a continuation application of Ser. No. 091,750 filed Jul. 15, 1993 now U.S. Pat. No. 5,302,986 which is a continuation of Ser. No. 921,044 filed Jul. 28, 1992 (abandoned), which is a continuation-in-part of Ser. No. 745,287 filed Aug. 14, 1991 (abandoned).

BACKGROUND OF THE INVENTION

Field of the Invention

This invention relates to an information recording control apparatus in a camera for recording photographing information on film.

Related Background Art

An information recording apparatus in a camera for recording information regarding photographing (photographing information) on a magnetic recording medium applied to film is known (see U.S. Pat. No. 4,864,332).

It is conceivable that by using such a recording apparatus, for example, the speed information of film is pre-recorded on the film and a camera reproduces and utilizes it or photographing information such as trimming information is recorded on film for each photographing frame thereof and is reproduced in the step of stretching out the film and the stretching-out process is carried out on the basis of said information. It is also conceivable to prerecord exposed frame information, reproduce it by a camera itself and position an unexposed frame at a pre-determined photographing position during the feeding of film.

Accordingly, the information recorded on the film must be recorded stably at a signal level of a range suited for reproduction.

However, there is the problem that if a gap exists between a recording head and the film or the recording film is inclined with respect to the recording track of the film when information is recorded on the film, a corresponding loss will occur in recording and stable information recording cannot be accomplished at a signal level of a desired range.

SUMMARY OF THE INVENTION

The object of the present invention is to provide an information recording control apparatus in a camera which can accomplish stable information recording at a signal level of a range suited for reproduction.

Describing the present invention with reference to FIG. 1 of the accompanying drawings which shows an embodiment thereof, the present invention is provided with reproducing means 1, MH for reproducing information pre-recorded on film, recording means 2, MH for recording information on the film, evaluation means 4a for evaluating the signal recorded state of the film on the basis of the output state of a reproduction signal by the reproducing means 1, MH, and control means 4b for setting the recording condition of the recording means 2, MH in conformity with the result of the evaluation by the evaluation means 4a.

The evaluation means 4a evaluates the reproduction signal when the reproducing means 1, MH reproduces the information pre-recorded on the film, and the control means 4b sets the recording condition of the recording means 2, MH in conformity with the result of the evaluation.

DETAILED DESCRIPTION OF THE PREFERRED EMBODIMENTS

Figure 1:
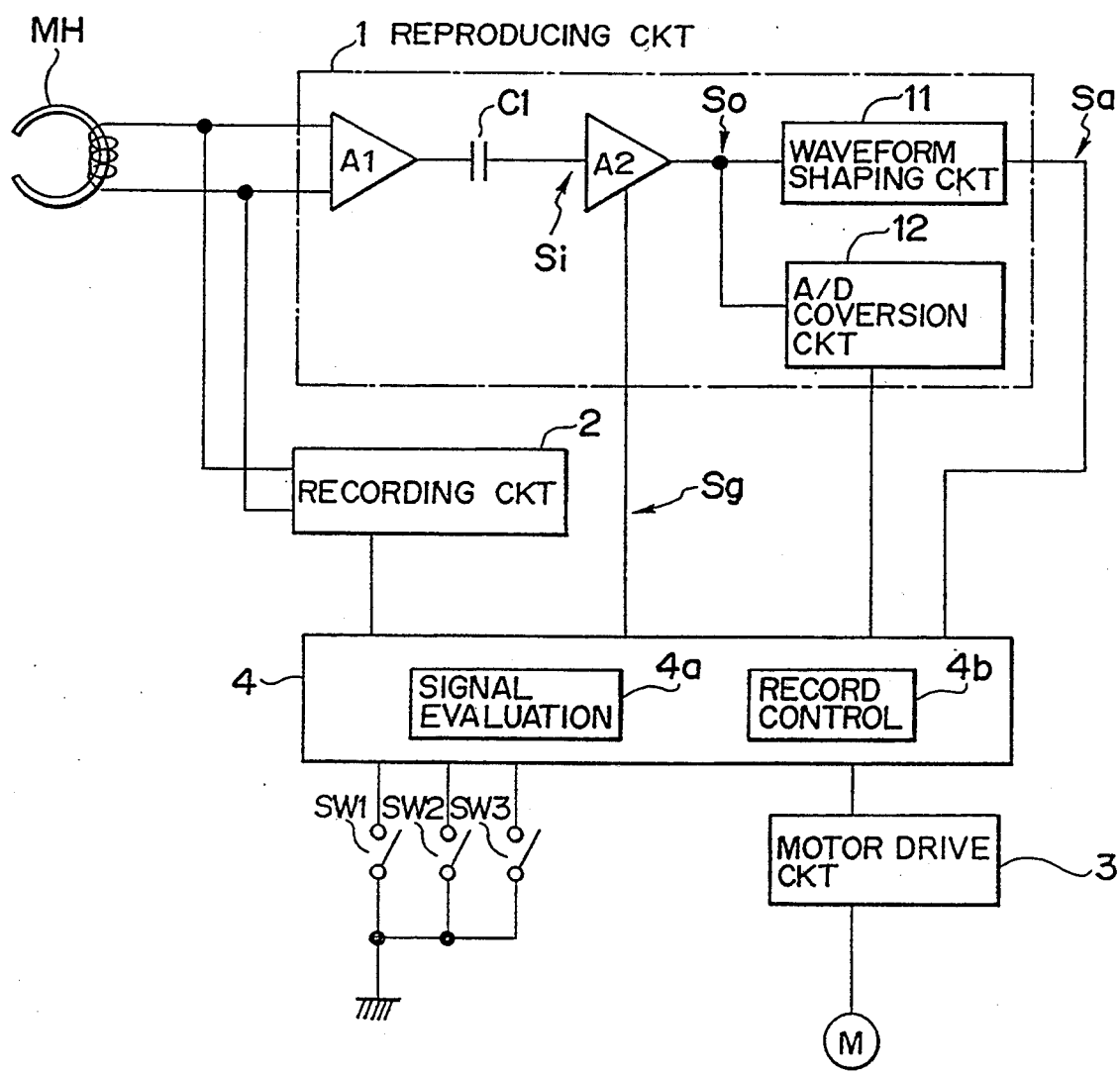
FIG. 1 is a block diagram showing an embodiment of the present invention.

FIG. 1 is a block diagram showing an embodiment of the present invention.

The reference numeral 1 designates a reproducing circuit which is comprised of a head amplifier A1, a gain control amplifier A2, a waveform shaping circuit 11 for waveform-shaping a reproduction signal, an A/D conversion circuit 12 for A/D-converting the reproduction signal, and a coupling capacitor C1, and reproduces film speed information or the like recorded on film through a magnetic head MH.

The reference numeral 2 denotes a recording circuit for recording the photographing information of each photographing frame on the film through the magnetic head MH. The reference numeral 3 designates a motor drive circuit for driving a film feeding motor M. Further, the reference numeral 4 denotes a control circuit comprising a signal evaluation unit 4a and a record control unit 4b. The control circuit 4 is comprised of a microcomputer and parts surrounding it. The signal evaluation unit 4a executes an information reproduction control program which will be described later and evaluates a reproduction signal, and sets the recording condition in conformity with the result of the evaluation. The record control unit 4b executes an information recording control program which will be described later and records information on the film.

SW1 denotes a switch adapted to be closed when a shutter release button is half-depressed, SW2 designates a switch adapted to be closed when the shutter release button is freely depressed, and SW3 denotes a switch adapted to be closed when the back lid of a camera is closed.

A method of evaluation the reproduction signal and a method of setting the recording condition will now be described.

It is assumed that the film speed information pre-recorded on the film is recorded at a uniform signal level under good quality control during the manufacture of the film. Such film is inserted into the camera, whereafter initial film advancing is effected and the speed information on the film is read through the magnetic head MH and reproduced by the reproducing circuit 1.

Figure 2:
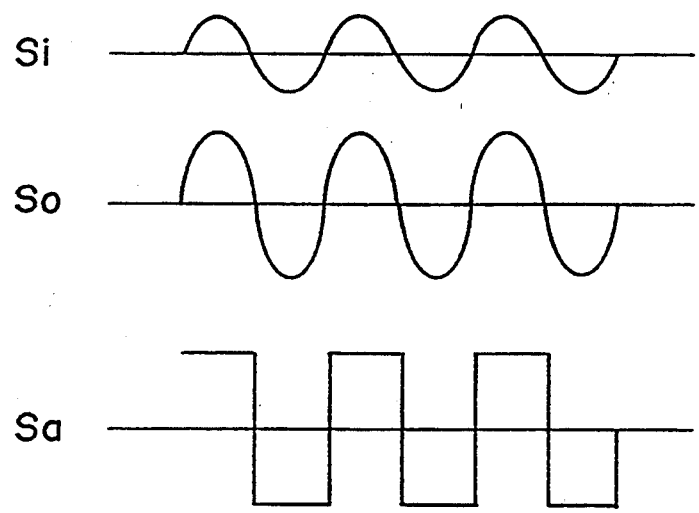
FIG. 2 shows the waveforms of a reproduction signal and a signal after the waveform shaping of the reproduction signal.

As shown in FIG. 2, the gain control amplifier A2 amplifies a reproduction signal input Si into an optimal output So by a gain g1 initially set by the control circuit 4. However, as described above, the reproduction signal level will be reduced if there is a gap between the magnetic head MH and the film or the magnetic head MH is inclined with respect to the recording track on the film.

In this embodiment, the amount of reduction in the level of the reproduction signal when the signal recorded at a uniform signal level is reproduced is detected, and the recording signal is amplified by an amount corresponding to the amount of reduction in the level during reproduction is amplified when information is recorded on the film, whereby recording is effected. That is, recording is effected at a signal intensity increased by an amount corresponding to the signal loss between the magnetic head MH and the film. Thereby, the information to be recorded on the film is recorded at substantially the same signal level as the film speed information pre-recorded on the film.

Now, the output Sol of the gain control amplifier A2 when the pre-recorded information is reproduced is $$Si \cdot g1 = Sol \qquad (1)$$

The A/D conversion circuit 12 A/D-converts the output Sol of this gain control amplifier A2 and outputs it to the control circuit 4. A gain g2 for optimizing the output of the gain control amplifier A2 on the basis of this signal Sol is calculated from equation (2) below.

$$g2 = So/Sol = So/(Si \cdot g1)$$

Thus, $$(Si \cdot g1)g2 = So \qquad (2)$$

That is, if the gain of the amplifier A2 is increased by g2, the signal loss between the magnetic head MH and the film can be corrected and information can be recorded at a signal level of a range best suited for reproduction.

The control circuit 4 outputs the set signal of this optimal gain $Sg = g1 \cdot g2$ to the amplifier 2 and changes the gain setting.

Subsequently, the control circuit 4 changes the recording condition when information is recorded on the film on the basis of the gain Sg increased during reproduction. For example, let it be assumed that in the recording circuit 2, the recording current for the gain Sg of the gain control amplifier A2 in each predetermined range is prescribed as follows:

| Gain Sg | Recording Current |
|---------|-------------------|
| 1–5     | 5 mA              |
| 6–10    | 7.5 (reference value) |
| 11–15   | 10                |
| 16–20   | 15                |

Assuming that as a result of the reproduction signal having been evaluated by the above-described method, the gain Sg of the amplifier A2 is changed from the initial value g1=6–10 to g1·g2=11–15, the recording circuit 2 increases the recording current output to the magnetic head MH from the reference value 7.5 mA to 10 mA.

The foregoing description is based on the premise that during reproduction, there is a signal loss between the magnetic head and the film, but in some cases, the reproduction signal is greater than the signal level, and at that time, the gain of the amplifier A2 is g2<1.

Thus, the recording condition is changed in conformity with the result of the evaluation of the reproduction signal and the recording of information is effected at a uniform signal level.

Figure 3:
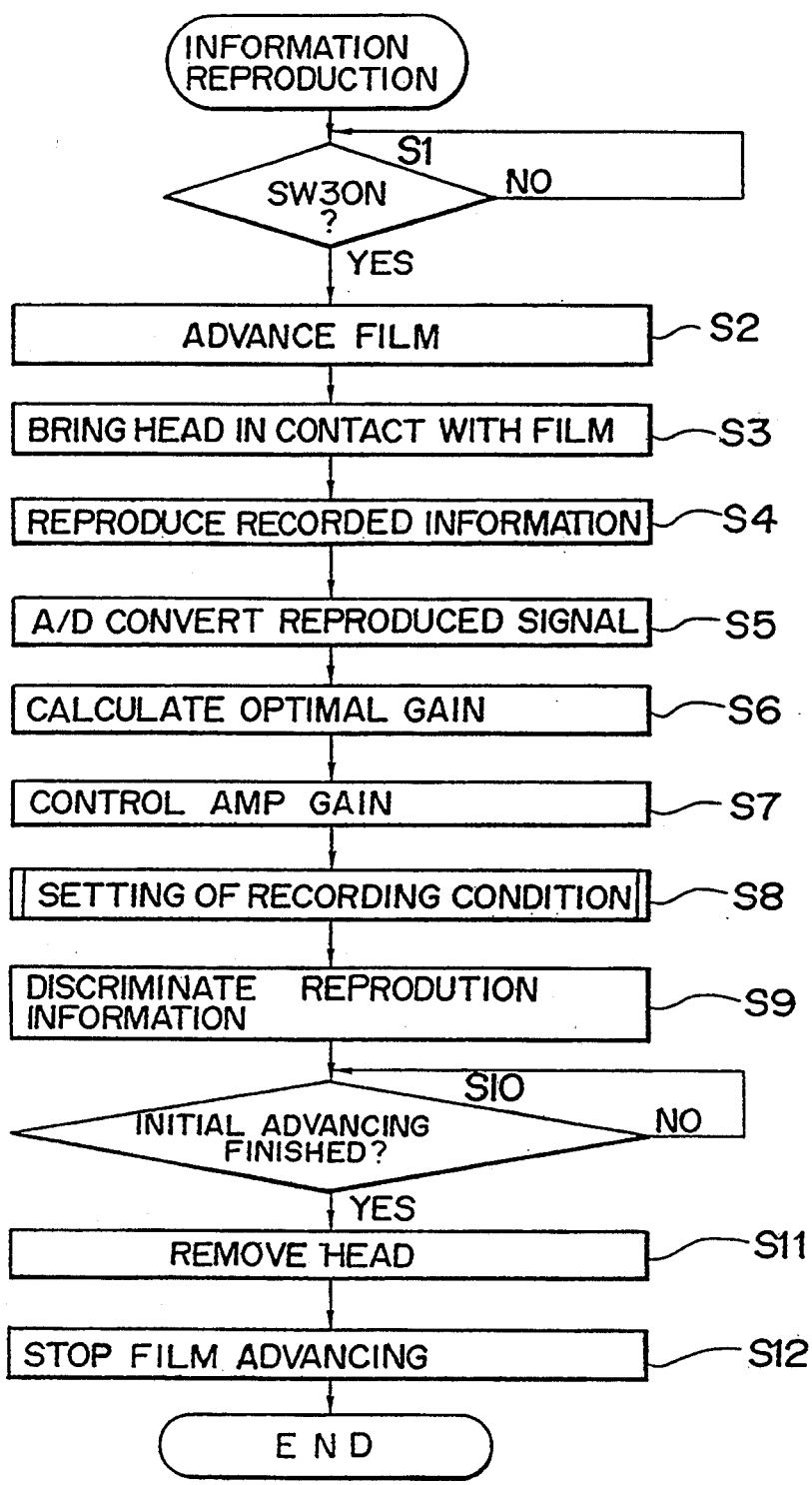
FIG. 3 is a flow chart showing an information reproduction control program.

FIG. 3 shows a control program for reproducing the information pre-recorded on the film, evaluation the reproduction signal and setting the recording condition. The reproducing operation of the apparatus of this embodiment will hereinafter be described with reference to FIG. 3.

At a step S1, whether the back lid of the camera has been closed is discriminated by the switch SW3, and this step is repeated until the back lid is closed. When the back lid is closed, advance is made to a step S2, where the film feeding motor M is started through the motor drive circuit 3, whereby the feeding of the film is started. At a step S3, the magnetic head MH is brought into contact with the film, and at the next step S4, the reproduction of the film speed information or the like pre-recorded on the film is started.

At a step S5, the A/D conversion of the reproduction signal Sol is effected, and then advance is made to a step S6, where the optimal gain Sg is calculated. Then, at a step S7, the gain setting signal Sg is output to the amplifier A2 to thereby change the gain setting. Thereby, as described above, the output of the amplifier becomes the optimal output value So.

Figure 4A:
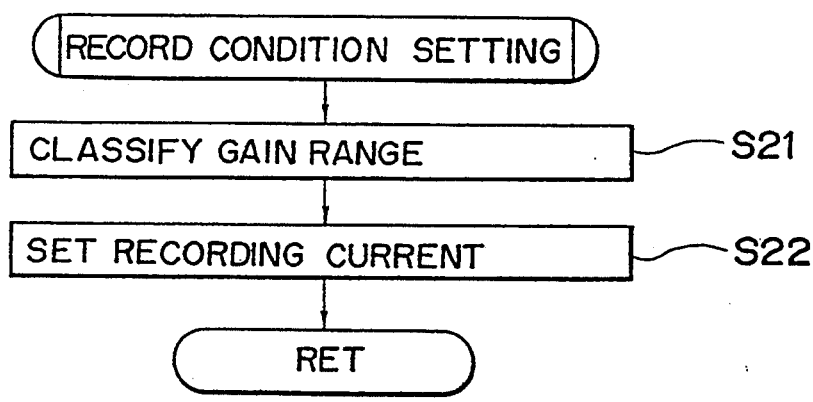
FIGS. 4A–4C are flow charts showing a recording condition setting subroutine, FIG. 4A showing a case where the recording condition is set by a recording current, FIG. 4B showing a case where the recording condition is set by a recording frequency, and FIG. 4C showing a case where the recording condition is set by the number of times of recording.

Subsequently, at a step S8, the recording condition setting subroutine shown in FIG. 4A is executed.

The gain Sg of the control amplifier A2 varies with the fluctuation of the reproduction signal input Si and therefore, at the step S21 of FIG. 4A, the gain Sg is sampled for a predetermined time and the range within which the gain varies is classified by the table shown above. If it is detected that the gain is varying within a predetermined range, advance is made to a step S22, where the recording current is set to a value prescribed for that gain range, and is stored in the memory 4a.

Thereafter, return is made to the program shown in FIG. 3, and advance is made to a step S9. At the step S9, the reproduction information such as the film speed is discriminated on the basis of the output Sa of the waveform shaping circuit 11 shown in FIG. 2. At the next step S10, whether the initial advancing of the film has been finished and the first frame has been fed to a predetermined photographing position is discriminated, and this step is repeated until the advancing is finished, whereupon advance is made to a step S11, where the magnetic head MH is retracted from the film and further, at a step S12, the advancing of the film is stopped and the execution of the program is terminated.

In the above-described embodiment, the recording condition is set by the recording current value output from the recording circuit 2 to the magnetic head MH, but alternatively, the recording condition may be set by a recording frequency. That is, when the reproduction signal Si is lower than a predetermined value, the recording frequency is made low to widen the interval between bits indicative of each information, thereby improving the separation characteristic so that the bits may not interfere between the peaks of the waveform.

Figure 4B:
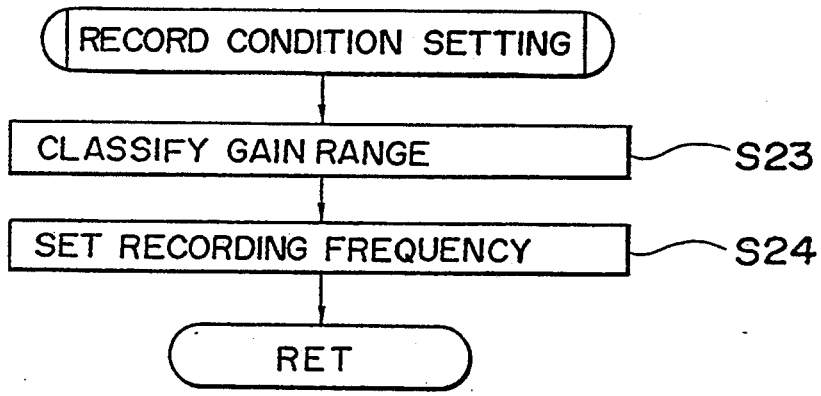

FIG. 4B shows the recording condition setting subroutine by this frequency. That is, at a step S23, the set gain range is classified in the same manner as described above, and at the next step S24, the recording condition is set to a recording frequency conforming to the classified range and is stored in the memory 4a.

Figure 4C:
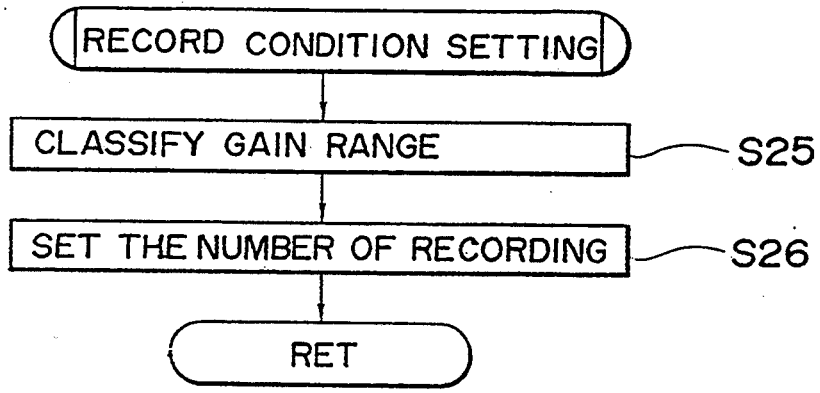

As a further alternative, the recording condition may be set by the number of times of recording. That is, when the reproduction signal Si is lower than a predetermined value, information is recorded a plurality of times. FIG. 4C shows the subroutine in this case. At the step S25 of FIG. 4C, the set gain range is classified, and at a step S26, the recording condition is set to the number of times of recording conforming to the classified range and is stored in the memory 4a.

Figure 5:
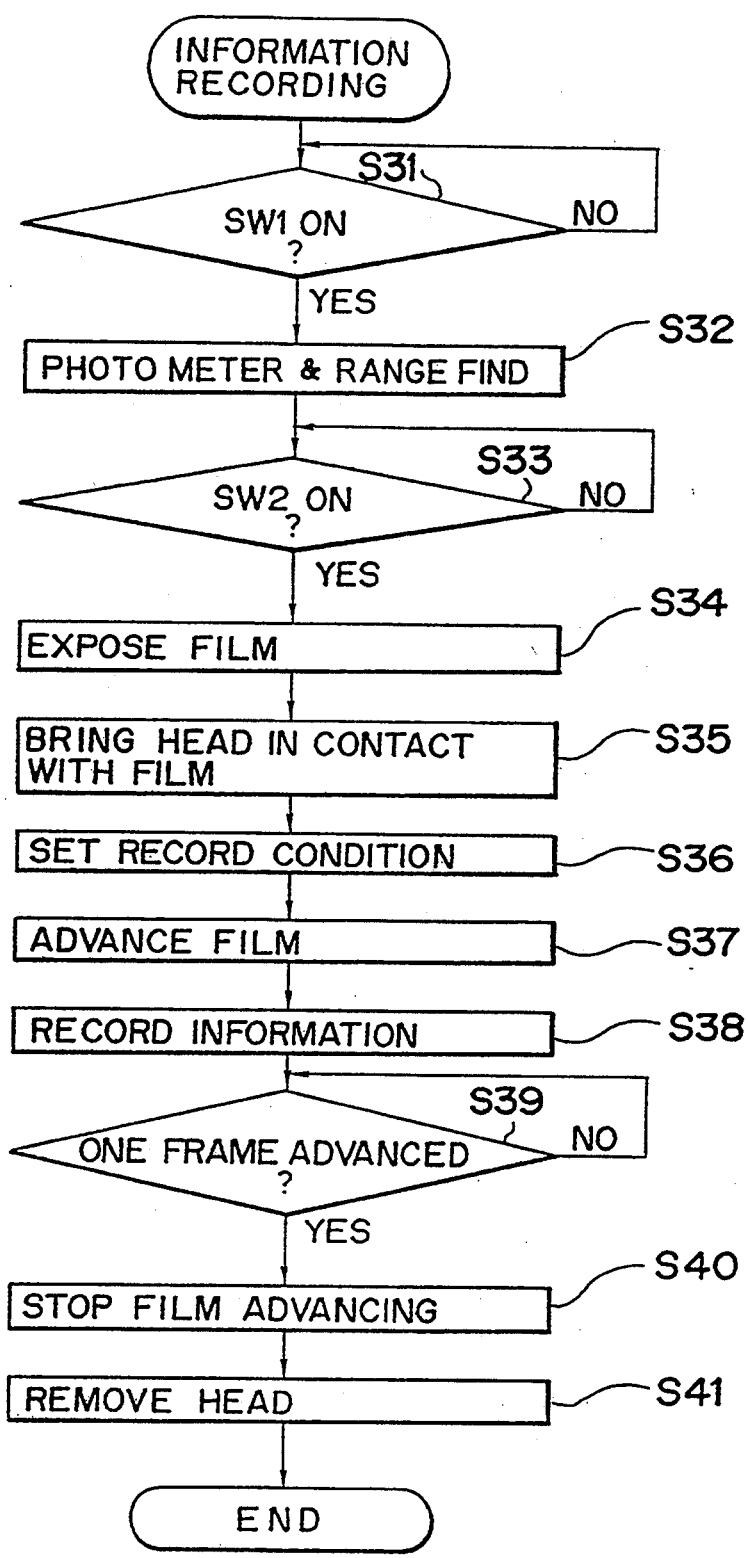
FIG. 5 is a flow chart showing an information recording control program.

FIG. 5 shows a control program for recording information on the film by the recording condition set by the control programs of FIGS. 4A to 4C being executed.

At a step S31, whether the shutter release button has been half-depressed is discriminated by the switch SW1, and this step is repeated until the shutter release button is half-depressed. When the shutter release button is half-depressed, advance is made to a step S32, where the object distance is measured by a range finder and a photo-taking lens is focused and at the same time the photo-taking picture plane is photo-metered by a photometry device and luminance information is detected. At a step S33, whether the shutter release button has been fully depressed is discriminated by the switch SW2, and this step is repeated until the shutter release button is fully depressed. When the shutter release button is fully depressed, advance is made to a step S34, where the shutter speed and the aperture value are calculated on the basis of the luminance information detected at the above-mentioned step, and a shutter mechanism portion and an aperture mechanism portion are driven to effect exposure.

At a step S35, the magnetic head MH is brought into contact with the film, and then advance is made to a step S36, where the recording condition stored in the memory 4a is read out, and this recording condition setting signal is output to the recording circuit 2. At a step S37, the motor M is started to start the advancing of the film, and at the next step S38, the information such as the photographing condition during the exposure executed at the above-mentioned step is recorded on the film. At this time, the recording circuit 2 outputs the recording current set at the above-mentioned step to the magnetic head MH and effects recording.

At a step S39, whether one frame advancing has been finished and the next photographing frame has arrived at a predetermined photographing position is discriminated, and this step is repeated until one frame advancing is finished. When one frame advancing is finished, advance is made to a step S40, where the motor M is stopped, and further at a step S41, the magnetic head MH is retracted from the film and the execution of the program is terminated.

In this manner, the information pre-recorded on the film is reproduced through the magnetic head MH and the recording condition during the information recording is set in conformity with the gain when the reproduction signal level is amplified to the optical value and therefore, regardless of the state of contact between the magnetic head MH and the film and the signal loss caused by the inclination or the like of the magnetic head with respect to the recording track, stable recording of information can be accomplished at a signal level suited for reproduction.

While in the above-described embodiment, the reproduction and recording of information are effected by the use of a magnetic head MH, the present invention can also be applied to a camera having a head exclusively for reproduction and a head exclusively for recording. In such case, a reproduction signal reproduced by the head exclusively for reproduction is evaluated to thereby detect the badness of the material of the film or the irregularity of application of the magnetic recording medium, and information recording is effected with the signal level regulated to eliminate those unstable factors.

Also, the above embodiment has been described with respect to a system for magnetically recording information on film, but the present invention can also be applied to a camera for optically or otherwise recording information on film. For example, where information is optically recorded, pre-recorded film speed information or the like is read by an optical type reading apparatus and in conformity with the result of this reading, the quantity of imprinting light is regulated during information recording.

Figure 6:
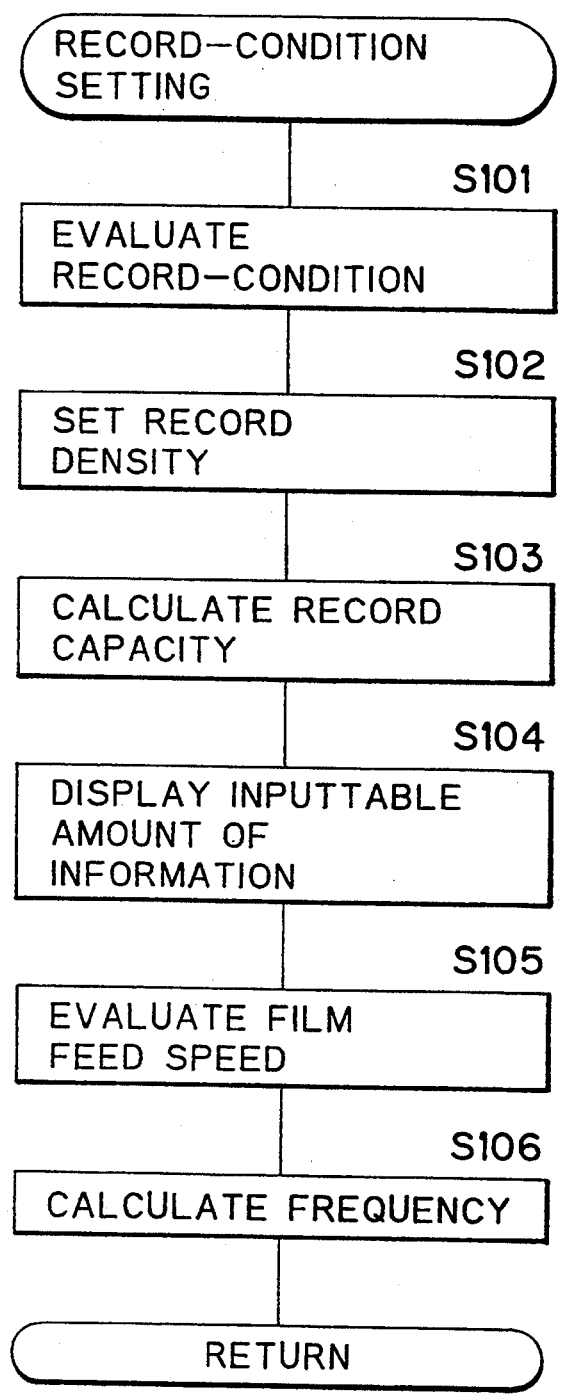
FIG. 6 shows a flow chart of detail of a record condition setting sub-routine shown in FIG. 4B.

Detail of record condition setting shown in FIG. 4B is now explained with reference to FIG. 6.

In a step S101, record condition to record information such as contact state of the film and the magnetic head MH and the inclination of the magnetic head MH to the magnetic track on the film is evaluated, as described above. In FIG. 4B, a gain setting range keep the reproduced signal output at a constant level is classified and the record condition is evaluated in accordance with the class although it is not restrictive. For Example, in a camera which does not permit high precision setting of a positional relationship between the film and the head, the record condition may be evaluated on the assumption that the reproduced signal output is low.

Figure 7:
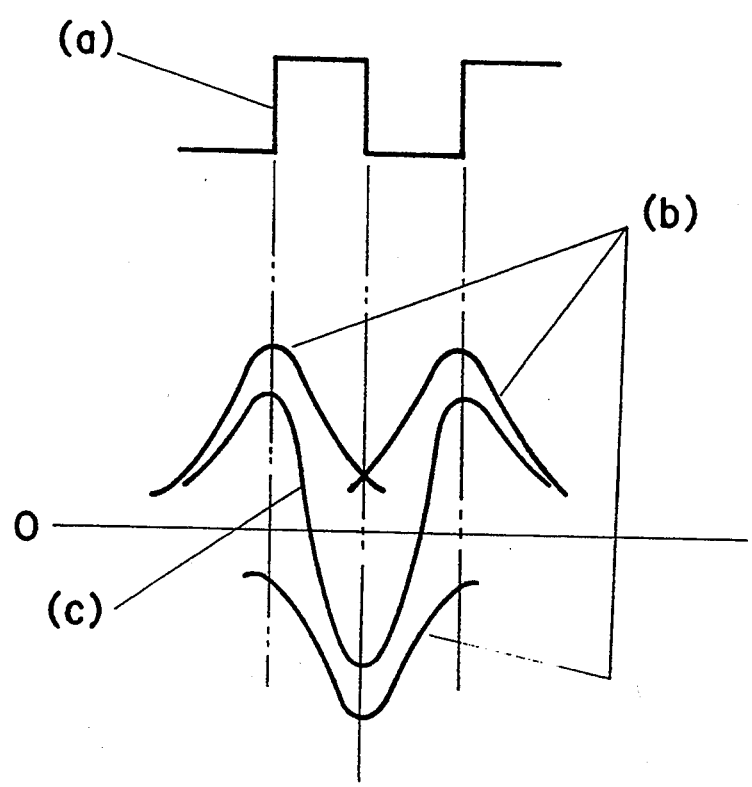
FIG. 7 shows a relation between an information record density and the reduction of a reproduced signal output.

In a step S102, an information record density is set based on the record condition evaluated in the above step. A system application range of the information record density is predetermined. In the present embodiment, a reference thereof is set to 20 bits/mm. When the record signal is to be reproduced, the lower the information record density in the record mode is, that is, the lower the record signal frequency is, the more accurate is the reproduction. FIG. 7 shows an information recording current waveform (a), discrete reproduced pulse waveforms (b) of reproduced signals corresponding a rising edge and a falling edge of the recording current waveform, and an actual reproduced signal waveform (c) which is a sum of the discrete reproduced waveforms. As seen from FIG. 7, when the frequency of the recording current waveform (a) is high, that is, when the information record density is high, the discrete reproduced pulse waveforms come close and a P-P value of the reproduced signal which is the sum of the discrete reproduced waveforms is lowered, that is, the reproduced signal output is lowered. The information record density in the system is set to a relatively good record condition. Accordingly, the information record density is lowered in accordance with the actual record condition to prevent the reduction of the reproduced signal output.

In a step S103, an information record capacity at the information record density which is set in accordance with the record condition is calculated. For example, assuming that the record density of 10 bits/mm is set in accordance with the evaluation of the record condition for the reference of 20 bits/mm, the amount of information which can be recorded in the same area is reduced to one half. In a step S104, an amount of information which a user may enter is displayed on a display (not shown). The information recorded comprises the information such as photographing date information which the camera automatically records and the information such as character information which the user manually enters. Usually, a sufficient record capacity is set for the information which the camera automatically records but the number of characters which the user can enter is limited as the record capacity is reduced. Accordingly, the amount of information which the user may enter is calculated in the following process based on the record capacity calculated in the above step and it is displayed on the display.

Assuming that the information record area for one frame of the film is 30 mm in length, the record capacity is calculated as a product of the area length and the information record density (10 bits/mm), that is, 30×10=300 bits. Assuming that the capacity of the information which the camera automatically records is 140 bits, the amount of information which the use may enter is 300−140=160 bits. Assuming that 16 bits are used for one character, 160/16=10 characters may be entered.

When more information that the number of permissible characters displayed on the display is entered, an alarm may be displayed on the display.

In a step S105, a film feed speed is evaluated to calculate the record frequency. This may be done by measuring a feed time at the initial feed after the loading of the film into the camera, at the rewinding or at the previous one-frame feed and determining the feed speed based thereon. In a step S106, the record frequency is calculated in the following process based on the determined feed speed and the information record density. For example, when the film feed speed is 380 ms/frame and the record density is 10 bits/mm and the information is to be recorded on the entire width of the frame length 30 mm, the record capacity is 38×10=380 bits/frame. Accordingly, the signal record period is equal to the time required for recording one-frame information (=time required for feeding one frame) 380 ms divided by the one-frame record capacity 380 bits, that is, 1 ms/bit. The record frequency which is a reciprocal of the record period is 1/1 ms=1KHz. Thus, when the information record density is 10 bits/mm and the reduction of the reproduced signal output is prevented.

Figure 8:
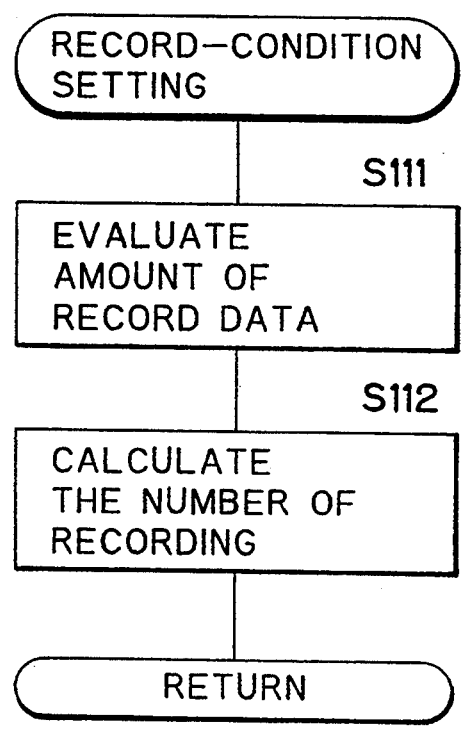
FIG. 8 shows a flow chart of detail of a record condition setting sub-routine shown in FIG. 4C.

Detail of record condition setting of FIG. 4C is now explained with reference to FIG. 8.

In a step S111, the amount of information to be recorded is evaluated. It is now assumed that 50-bit information is to be recorded in one frame. In a step S112, how many times the evaluated amount information can be repeatedly recorded in the one-frame information record area is calculated. For example, when the one-frame information record area is 30 mm and the information record density determined by evaluating the record condition is 10 bits/mm, the information record capacity per frame is 30×10=300 bits. Accordingly, the 50-bit information can be repeatedly recorded 300/50=6 times. In the present embodiment, the number of times of repetitive recording is calculated for each frame based on the amount of information to be recorded. Alternatively, an upper limit to the amount of information to be recorded may be set in accordance with the evaluation of the record condition and the information may be recorded within the upper limit.

In the construction of the above-described embodiment, the reproducing circuit 1 and the magnetic head MH together constitute reproducing means, the recording circuit 2 and the magnetic head MH together constitute recording means, and the control circuit 4 constitutes evaluation means and control means.

As described above, according to the present invention, information pre-recorded on film is reproduced and the signal recorded state on the film is evaluated on the basis of the output state of the reproduction signal. The recording condition during recording is set in conformity with the result of the evaluation and therefore, stable information recording can be accomplished at a signal level of a range suited for reproduction.

What is claimed is:

1. A method for recording information on a photographing film, comprising the steps of:
   reproducing information pre-recorded on said film;
   evaluating a state in which a signal is recorded on said film on the basis of an output amplitude state of a reproduction signal reproduced by said information reproducing;
   setting a condition for recording information on said film in conformity with the result of the evaluating; and
   recording information on said film in the set condition.

2. A method for recording information on a photographing film, comprising the steps of:
   reproducing information magnetically recorded on the film;
   evaluating a state in which a signal is recorded magnetically on said film on the basis of an output amplitude state of a reproduction signal reproduced by said information reproducing;
   setting a recording condition for recording information on said film in conformity with the result of said evaluating; and
   recording information magnetically on said film in the set condition.

* * * * *